June 30, 1970   B. Y. MOSS   3,518,514

OUTLINE FOLLOWING APPARATUS

Filed July 30, 1968   3 Sheets-Sheet 3

Inventor
Brian Yodall Moss
By Watson, Cole, Grindle & Watson
Attorney

United States Patent Office 3,518,514
Patented June 30, 1970

3,518,514
OUTLINE FOLLOWING APPARATUS
Brian Yoxall Moss, Norbury, Surrey, England, assignor to Morfax Limited, a company of Great Britain
Filed July 30, 1968, Ser. No. 748,782
Claims priority, application Great Britain, May 9, 1968, 22,027/68
Int. Cl. G05b 19/04
U.S. Cl. 318—640                6 Claims

ABSTRACT OF THE DISCLOSURE

An outline following device includes a stop circuit responsive to a lateral marking adjacent to the outline being followed. The device includes a follower head having a rotatable member supporting an oscillatory mount for light-sensitive devices. One or more of such devices serve as the primary control for the follower head so as to impart steering motion to the rotatable member and said steering motion is coupled to co-ordinate drive systems for displacing the follower head around the outline to be followed. The mount includes an additional light-sensitive device which is coupled to a stop circuit which prevents displacement of the follower head in response to the lateral marking.

Figure 1:
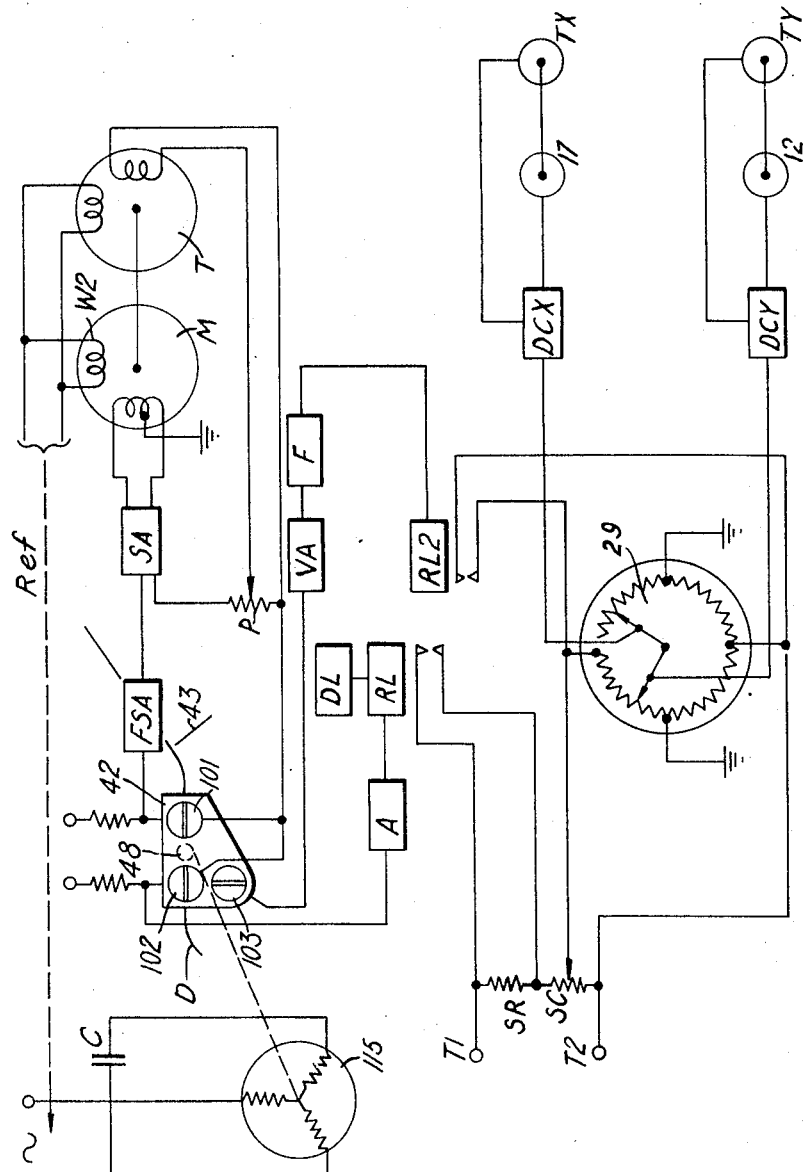

The present invention relates to outline following apparatus adapted to trace or follow a subject which may be a pattern, outline or template or a line drawing representing a component to be reproduced for example by a machine tool such as a milling machine or by a flame cutting machine, or by any other workpiece shaping machine.

In co-pending applications Ser. No. 594,768, filed Nov. 16, 1966, now Pat. No. 3,470,376, dated Sept. 30, 1969, and in Ser. No. 671,682 filed Sept. 29, 1967, outline following apparatus is described in which a follower head is adapted to be caused to move around an outline or pattern to be followed, and said follower head may be directly linked to a workpiece treating machine, or the movements of the follower head may be recorded on a recording medium, for example magnetic tape, which is turn is used to control a workpiece treating machine.

The present invention is concerned with outline following devices such as typically shown in the aforesaid co-pending applications in which repetitive relative motion is produced between an image of the outline or pattern being followed and at least one light-sensitive device and the fluctuating signals produced from said light-sensitive device are utilised for operating a servo motor which effects a rotary or steering motion of the follower head so as to hold it centered upon the outline being followed, and signals derived from said rotary motion are utilised to produce translatory motion of the head about co-ordinate axes thus causing it to travel around the outline being followed. The follower head may be directly coupled to a workpiece shaping machine or such movements may be used for the production of recorded signals or information suitable for subsequent use on a workpiece shaping machine. It should be understood, therefore, that the features of the present invention may be associated with different outline following equipment operating in the same manner other than those described in the above-mentioned applications.

In the treatment of workpieces under the control of such outline following apparatus it may be desired to stop the movement of the follower head at predetermined points for the purpose of performing some additional machining function, for example for drilling holes in the workpiece at such predetermined points, and the present invention has for its object to provide simple and reliable means for effecting selective control or stoppage of the follower head while traversing an outline in response to special markings imparted to the outline at or adjacent to the outline.

A further object of the present invention is to provide an arrangement for stopping the movement of an outline following device or apparatus in response to a marker disposed laterally of the outline.

A still further object of the present invention is to provide means for stopping the travel of a follower head while traversing an outline being followed in response to a marking on the outline which may be in the nature of a cross line and in which the follower head is caused to stop in response to a marking on the outline which may be in the nature of a cross line and in which the follower head is caused to stop in response to the part of such a cross line or other marking lying laterally and to one side of the outline being followed. A still further object of the present invention is to provide a construction in which additionally to at least one light-sensitive device controlling the movements of the follower head an additional laterally positioned light-sensitive device is provided associated with independent circuits adapted to effect stoppage of the follower head in response to a stop line marked on the outline being followed and adjacent thereto.

A still further object of the present invention is to provide a follower head in which an oscillatory mount supports at least one primary control light-sensitive device which is caused thereby to oscillate in relation to an image of the outline being followed to produce control signals for operating a servomotor controlling the rotary movement of a carrier serving to support the oscillatory light-sensitive device or devices and in which a further laterally positioned light-sensitive device is provided adapted to produce signals only on the approach of a transverse stop line marked adjacent to the outline, such signal being caused to pass through an amplifier and filter sensing the maximum signal output at twice the oscillation frequency when that additional light-sensitive device is centered upon the stop line to actuate a stop switch means preventing further movement of co-ordinate drive motors effecting the translatory movement of the follower head in response to the rotary position of said support.

The various features of the present invention are illustrated by way of example on the accompanying drawings which represent improvements in or additions to the features described in co-pending application Ser. No. 671,682 referred to above, and attention is directed to said specification for further explanation of the constructional features of the invention.

Figure 2:
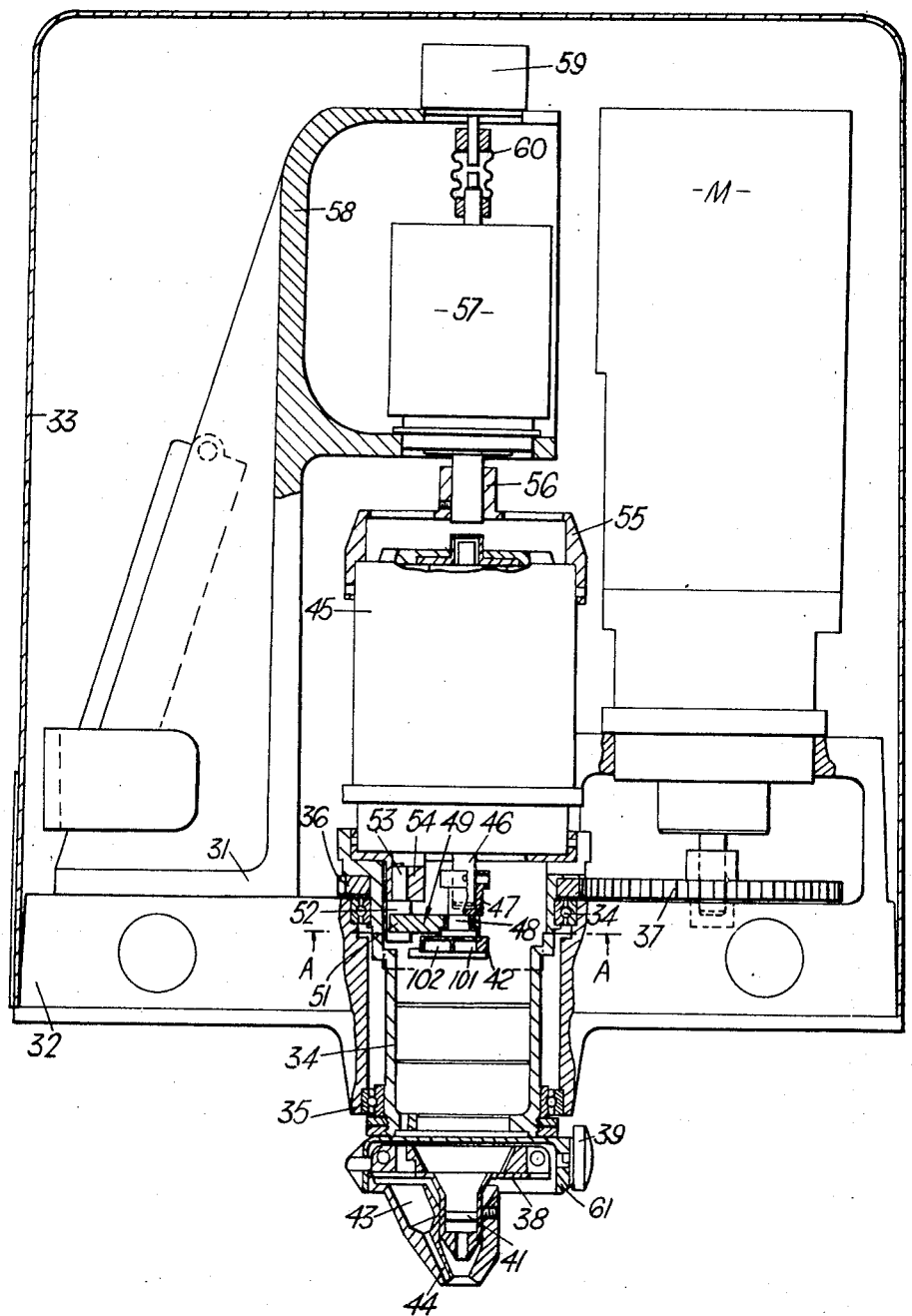
Figure 3:
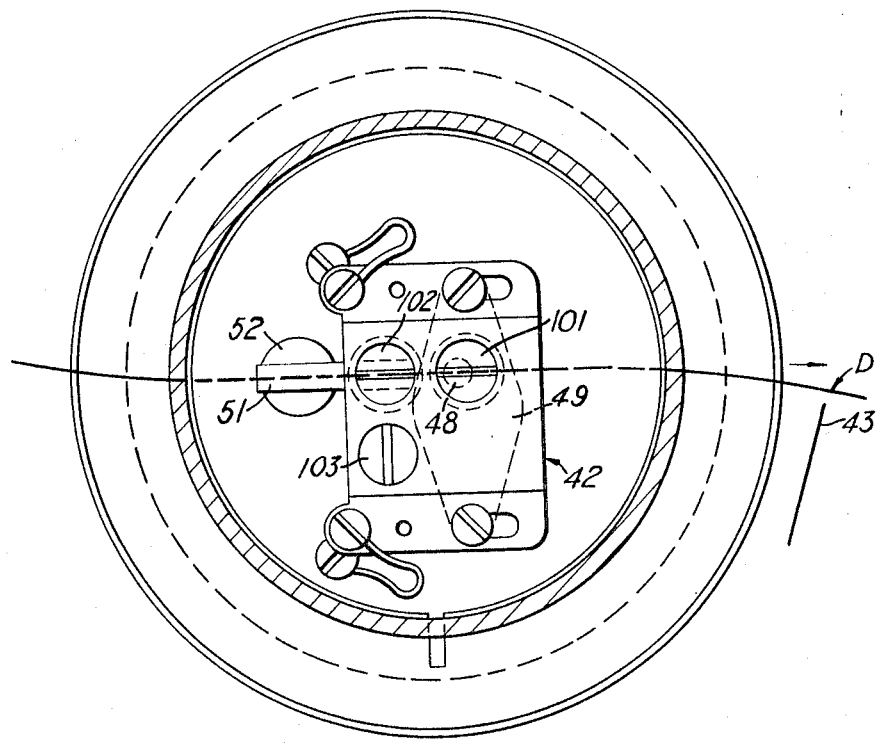

FIG. 1 is a block circuit diagram illustrating the main features of the present invention, FIG. 2 is a vertical longitudinal section through the follower head as described in said last-named co-pending application, and FIG. 3 is a section on the line A—A in FIG. 2 showing the oscillatory mount for the light-sensitive devices including the additional light-sensitive device produced according to the present invention.

It should be explained in the first place that the follower head, the details of which are shown on FIGS. 2 and 3, is mounted on a carriage movable in two directions along X- and Y-axes as described in said co-pending application, the movements along the X- and Y-axes being effected by co-ordinate drive motors 17, 12 shown on FIG. 1 of the accompanying drawings which conveniently operate the carriage through respective lead screws or other equivalent means. The provision of means of this character for displacing a follower head over an outline to be followed is disclosed in said co-pending application and is not therefore illustrated in detail.

The construction of the follower head is described in said co-pending application and will be described with reference to FIGS 2 and 3 of the drawings. It will be noted that a main body member 31 is bolted to a base 32 supporting a metal or plasics cover 33. A central bore in the base 32 supports a rotatable member or tube 34 by means of ball bearings 35 and a toothed ring 36 on the tube 34 is engaged with a gear wheel 37 operated by a servo motor M supported by the base 32 parallel to the vertical axis of the member 34. At the lower end the member 34 incorporates an adjustable cross slide assembly 38 adapted to be fixed after adjustment by means of a knurled knob 39.

The slide carries an optical lens system 41 by which an image of a drawing outline D (FIG. 1) being followed is projected on to light-sensitive devices, such as light-dependent resistors, carried by an oscillatory mount 42. The lower part of the slide 38 provides a mounting for one or more pilot light sources located within a housing portion 43 and adapted to project a marker pencil of light on to the outline-bearing surface through an opening or window 44 which assists in bringing the follower head into position over the outline. The outline is suitably illuminated by adjacently positioned light sources, not shown, which may be energised by direct current. Electric conections are made to various electrical components carried by the member 34 by means of a siutable slip ring unit 57 which may be a commercially available unit.

The upper end of the member 34 is enlarged as indicated to receive a synchronous rotary driving motor 45 the driven shaft 46 of which carries a bushing 47 having an eccentric driving pin 48. The driving motor 45 is preferably a three-phase motor, the third phase being obtained from the single phase supply by a phasing capacitor C.

The pin 48 is engaged in a ball bearing rotatable in an aperture in an oscillator block 49 the lower face of which carries the mount 42 for the light-sensitive devices conveniently non-coincidentally with the aperture in the block 49. The latter is provided with a radially disposed arm 51 which is constrained by being engaged in the forked bottom part 52 of a spindle 53 rotatable in a bore in a lug 54 projecting inwardly of the bore within the member 34.

It will be seen that when the driving motor 45 is in operation the aperture in the oscillator block is rotated in a circular path about the main vertical axis of the motor 45 while the projecting arm 51 of the oscillator block 49, being accommodated in the forked end part 52 of the spindle 53, moves in a linear reciprocatory manner.

As shown the mount 42 carries three light-dependent resistors 101, 102 and 103. The light-dependent resistors 101 and 102 comprise primary devices for controlling the steering motion of the member 34 to ensure that at all times the oscillation of the mount 42 is centered on the outline D. The device 101 provides the main control signal and, being nearer the arm, executes a substantially elliptical movement—or more correctly an oval movement—with the major axis along the image of the outline D. The light-dependent resistor 102 serves as a forward-seeking element and lies on the opposite side of the pin 48 to the arm 51 and it will thus execute an approximately elliptical movement with its major axis transverse to the length of the image of the outline, which extends in the same direction as the arm 51 under normal operating conditions.

The light-dependent resistor 103 is shown on FIG. 3 with exaggerated spacing from the other resistors 101, 102 and the axis of the additional resistor is at right angles to the axis of the resistors 101 and 102. This light-dependent resistor 103 is used for producing the stop signal as described hereinafter with reference to FIG. 1 which illustrates the operating principles of the present invention.

The outline D being followed is for example a drawing mounted on the table 16 and is illuminated by one or more light sources. A magnified image of the outline being followed is formed in a plane containing the light-dependent resistors 101, 102 and 103 and the mount 42.

So far as the light-dependent resistors 101, 102 are concerned a signal output is produced which includes a phase conscious component at twice the oscillation frequency because the outline D is crossed twice in each cycle by the light-dependent resistors 101, 102.

The output signal from the resistor 101 is applied to an amplifier FSA which embodies filter circuits adapted to reject components at twice the oscillation frequency. The resulting signal varies in phase depending on the angular disposition of the outline D relatively to the oscillatory movement of the holder 42 and is fed to a servo amplifier SA feeding a main winding $W_1$ of the servo motor M. A further winding $W_2$ receives a reference frequency from the line supply. The motor M is thereby caused to rotate in one direction or the other, thereby steering the rotatable member 34 and the associated parts, in one direction or the other according to the path of the outline being followed. When the outline D is centrally positioned in relation to the oscillatory movement of the holder 42 the windings $W_1$ and $W_2$ produce no torque so that the servo motor M is stationary. As the follower head approaches a deviating section of the outline D the current in the winding $W_1$ varies in phase so that the motor M exerts a torque in one direction or the other which results in a steering motion being imparted to the rotatable member 34 such that it is steered so as still to follow the outline and so that the linear movement of the arm 51 is centred on the outline or a tangent thereto at the point of scanning.

The change in the rotary position of the member 34 actuates the sine/cosine potentiometer 59 to vary the operation of the co-ordinate drive motors 17 and 12 in such manner that the follower head moves laterally as required to follow the changing drawing outline D. The amplifier SA also receives from the potentiometer resistor P an adjustable feed back sensitivity signal from a tachometer generator T driven by the servo motor M and which also receives the reference frequency.

The forward seeking light-dependent resistor 102 feeds an amplifier A in turn operating a relay RL associated with a delay circuit DL which delays the operation of a relay RL a contact $RL_1$ of which provides a slow-down control in association with the circuits driving the X- and Y-axis co-ordinate motors, as explained below. The result is such that when the forward-seeking light-sensitive device 102 senses a substantial change in direction in the outline, the relay RL which is energised in normal operation, is released and the speed of the co-ordinate motors is reduced. The re-closing of the relay is delayed sufficiently by the delay device DL to ensure smooth and correct operation.

Referring now to the operating circuit for the X- and Y-axis driving motors, shown on FIG. 1 at 17 and 12, it will be seen that the sine/cosine potentiometer 59 is energised from a floating stabilised reference voltage supply at terminals $T_1$ and $T_2$. A slow-down resistor SR and a speed control potentiometer SC are connected in series across the terminals $T_1$ and $T_2$ the resistor SR being in turn shunted by the contact RL1 of the relay RL. A variable voltage from the speed control resistor SC is fed to opposed inputs of the potentiometer 59 while points at right angles thereto are grounded as indicated. The two moving elements of the sine/cosine potentiometer 59 disposed at right angles one to the other are connected to D.C. amplifiers DCX and DCY feeding the two co-ordinate driving motors 17 and 12. Each of these motors is associated with a tachometer generator TX and TY respectively which provide a feed back signal to the amplifiers DCX and DCY.

The speed of operation of the motors 17 and 12 is dependent on the setting of the speed control potentiometer SC and under normal conditions the slow-down resistor SR is short-circuited by the relay contact $RL_1$. If there is a sudden change in direction in the outline this change is sensed by the light-dependent resistor 102 to operate the relay RL which releases that relay and the slow-down resistor SR becomes effective to reduce the speed of the motors 17 and 12 so that the follower head moves somewhat more slowly as the sudden change in direction is encountered and traversed.

In the foregoing description of the operation of the equipment it is assumed that the light-dependent resistor 103 receives no signal since the follower head is following the line D and the surface of the drawings or other element bearing the outline is uniform and bears no control markings for most of its area. However, as the follower head approaches a transversely disposed stop line, as indicated at 43, a fluctuating signal is produced by the light-dependent resistor 103 which is an alternating current signal comprising a component of twice the oscillation frequency the amplitude of the latter component increasing to a maximum when the movement of the light-dependent resistor 103 spans the image of the stop line 43.

To sense the magnitude of the said component a variable gain amplifier VA and a filter F are energised from the output of the light-dependent resistor 103 and the output from the filter is fed to a further relay RL2 which is thus energised when the light-dependent resistor 103 has sensed the presence of the stop line 43. The point at which the relay RL2 is energised is dependent within fine adjustable limits on adjustment of the gain of the amplifier VA, thereby permitting the point of stoppage to be accurately set according to particular requirements. Contacts associated with the relay RL2 are connected as shown so as to short-circuit the output from the speed control potentiometer SC thus cutting off the input to the sine/cosine potentiometer 59 operating the X- and Y-axes co-ordinate drive motors 17, 12 respectively.

The follower head is restarted when a further signal is received indicating that the operation to be performed on stoppage of the follower head has been completed. This restart sign may be obtained automatically or manually according to the particular function concerned. Variation of the gain of the amplifier provides for adjustment of the position at which the equipment is stopped in relation to the thickness of the stop line scanned by the light-dependent resistor 103 and thus controls the true stop position relatively to one flank of the thickness of the stop line 43.

The operation of the equipment so far described will be readily understood. A drawing, for example of a component to be machined, is produced incorporating lateral transverse markings indicating desired stop positions of the follower head. The follower head is brought into position over the outline and commences to traverse the outline in the manner already described in the aforesaid applications, signals derived from the light-dependent resistors 101 and 102 providing the steering signals for the servo motor controlling the rotary position of the follower head and further signals controlling the translation movement of the follower head along X- and F-axes. The additional light-dependent resistor 103 is inoperative until the light-dependent resistor 103 approaches a stop line 43. This produces a stop signal as soon as the follower head is in the predetermined position upon the stop line 43. If desired the initial signal received from the light-dependent resistor 103 on the approach of a stop line 43 produces a slow-down signal to ensure that the follower head stops accurately centered on the stop line 43.

The invention is not limited to the provision of one such additional light-dependent resistor 103. A further similar light-dependent resistor may be provided on the other side of the mount 42 to respond to other marking elements on the other side of the outline D, and this second additional light-dependent resistor may be used to perform other control operations. At least one of the additional light-dependent resistors may be inherently colour-sensitive or may be associated with a suitable colour filter so as to respond only to coloured lines or areas marked on the outline. Thus for example the second additional light-dependent resistor may respond to coloured areas applied to a drawing bearing the outline being followed adjacent to a sudden change in direction of the outline for the purpose of providing a slow-down signal. This slow-down signal may replace the slow-down signal derived from the forward seeking resistor 102 or may be additional thereto or of course the second additional light-dependent resistor may be used for performing some different machining function.

In the embodiments described the head 5 may be directly linked to a meal cutting tool as already indicated, or the co-ordinate movements of the head 5 may be recorded on any suitable recording medium, for example magnetic tape and the tape record used on a separate machine for controlling the co-ordinate movements of the cutting tool.

What I claim is:

1. An outline following device including a follower head assembly, said assembly comprising a rotatable member, a reciprocably supported mount in said assembly, a primary light-sensitive device carried by said mount, means for producing an image of said outline being followed at said light-sensitive device which thereby produces oscillatory signals, the major axis of said primary light-sensitive device lying along the image of said outline means operative responsively to said signals to control the rotary steering movement of said rotatable member to maintain it centred on the outline, said device further comprising a co-ordinate axis drive system to cause the follower head to travel progressively around the outline in response to the rotary movements of the rotatable member and said mount further comprising an additional light-sensitive device adapted to scan a portion of a surface bearing said outline and adjacent to the latter and responsive only to a lateral marking adjacent said outline, the axis of said additional light-sensitive device lying at a right angle to the axis of said primary light-sensitive devce, and means to stop movement of the follower head in response to signals received from said additional light-sensitive device.

2. An outline folowing device as claimed in claim 1, comprising an amplifier receiving signals from said additional light-sensitive device, a filter circuit and switch means operated by the output of the filter to stop movement of the follower head.

3. An outline following device as claimed in claim 2, wherein the mount comprises two primary light-sensitive devices operable simultaneously to control the following action of the follower head when sensing a change in direction of the outline, the axis of each said primary light-sensitive devices lying along the image of said outline, a servo motor actuating the rotatable member to control the steering motion thereof responsively to one of said devices, means for producing co-ordinate signals responsive to the rotary position of said rotatable member, co-ordinate drive motors operated by said latter means to control said drive motors to effect travel movement of the follower head, an input circuit to said means for producing co-ordinate signals, a slow-down circuit operated by the other of said primary light-sensitive devices to regulate the speed of operation of said co-ordinate drive motors, and means to make inoperative the said input circuit in response to signals received from the additional light-sensitive device.

4. An outline following device as claimed in claim 3, wherein the co-ordinate signal-producing means consists of a sine-cosine potentiometer and further comprising X- and Y-axis driving motors operated from outputs of said sine/cosine potentiometer, the movable assembly of said potentiometer being displaced by the rotation of the said rotatable member in response to the servo motor, relay means operable by the said other light-sensitive device to reduce the feed to the input circuit of the sine/cosine potentiometer when detecting a sudden change in direction of the outline being followed, and further relay means operable by the additional light-sensitive device to render said input circuit inoperative on sensing the presence of a stop line adjacent to the outline being followed.

5. An outline following device as claimed in claim 3, wherein oscillatory displacement is imparted to all said light-sensitive devices by means of a synchronous rotary motor operated from an alternating current supply which furthermore provides a signal for energising a reference winding of the servo motor and in which the said light-sensitive devices are carried by a mount guided linearly by a guide member engaged in a rotatable support and operated by an eccentric pin driven by the synchronous rotary motor to impart an approximately elliptical motion to all of said light-sensitive devices which produce signals in circuits fed by said light-sensitive devices, which signals nclude a variable phase frequency component of twice the oscillation frequency.

6. An outline following device as claimed in claim 2 wherein the amplifier fed by the additional light-sensitive device is a variable gain amplifier and the filter circuit is tuned to twice the oscillation frequency whereby adjustment of the gain of said amplifier regulates the point of stoppage of the follower head relatively to the scanning response on encountering a stop line adjacent to the outline.

References Cited
UNITED STATES PATENTS 3,135,904   6/1964   Purkhiser _____ 318—31

BENJAMIN DOBECK, Primary Examiner

U.S. Cl. X.R.

318—31